United States Patent [19]

Takahashi et al.

[11] Patent Number: 5,089,833
[45] Date of Patent: Feb. 18, 1992

[54] CAMERA

[75] Inventors: Minoru Takahashi; Mitsuo Yokota, both of Saitama, Japan

[73] Assignee: Fuji Photo Film Co., Ltd., Kanagawa, Japan

[21] Appl. No.: 652,781

[22] Filed: Feb. 8, 1991

[30] Foreign Application Priority Data

Feb. 9, 1990 [JP] Japan .................................. 2-29912

[51] Int. Cl.⁵ .......................... G03B 1/18; G03B 17/24
[52] U.S. Cl. .................................... 354/105; 354/173.1
[58] Field of Search ................ 354/173.1, 173.11, 105, 354/106

[56] References Cited

U.S. PATENT DOCUMENTS

| | | | |
|---|---|---|---|
| 4,344,682 | 8/1982 | Hattori | 354/106 |
| 4,470,677 | 9/1984 | Tsujimoto et al. | 354/106 |
| 4,588,274 | 5/1986 | Kazumi | 354/105 |
| 4,664,491 | 5/1987 | Kazumi et al. | 354/105 |

Primary Examiner—Michael L. Gellner
Attorney, Agent, or Firm—Young & Thompson

[57] ABSTRACT

A camera comprising a main body section and a rear cover section each having at least one microcmputer therein, and comprising a film rewinding switch disposed in the rear cover section for rewinding a loaded film at an appropriate time. A device is provided, for checking whether the microcomputers in the main body section and the rear cover section can communicate with each other. If the communication between the microcomputers is not possible, the film is rewound independently of the film rewinding switch.

7 Claims, 4 Drawing Sheets

CAMERA

BACKGROUND OF THE INVENTION

The present invention relates to a camera, especially to a camera comprising plural built-in microcomputers which communicate with each other to execute a series of control steps.

In a camera comprising a main body section and a rear cover section, it is known to provide plural microcomputers disposed respectively in the main body section and the rear cover section. The microcomputer in the main body may control photography, film advance and flashing, while the microcomputer in the rear cover may control the other supplemental functions.

Furthermore, in the case of a camera having a date module for recording the date and other data on a loaded film, it is preferable to provide a microcomputer in the rear cover for controlling the date module, because, although a battery for circuitry in the camera main body needs to supply relatively high power and thus must be changed frequently, the date module draws only as much electric power as a wristwatch, and so the power supply for the microcomputer for the date module will last for four to five years. As the result, it becomes possible to store data in the date module for a long time.

It is also preferable to dispose various kinds of mode selection switches including a film rewinding switch integrally in the rear cover, because this construction facilitates the operation of the switches and lowers the cost of the camera. Meanwhile, a film rewinding switch is adapted to rewind the film before the loaded film has entirely been exposed if the rear cover must be opened to repair the camera, or to change the battery, for instance.

However, because the condition of the battery for the date module cannot be monitored, there is a danger that the battery has discharged suddenly during photography. In such a case, if the film rewinding switch and a microcomputer for controlling the film rewinding switch are disposed in the rear cover and are supplied by the battery common to the date module, the film rewinding switch cannot operate. This problem will occur if any trouble occurs in the microcomputer for the manual film rewinding switch, such as a breakdown of the connection between the microcomputer and a battery, or a fault in the microcomputer itself.

SUMMARY OF THE INVENTION

It is therefore an object of the present invention to improve a camera wherein first and second microcomputers capable of data communication with each other are disposed both in its rear cover section and in the main body section, and a film rewinding switch is provided to rewind a loaded film at an appropriate time, such that it becomes possible to dispose the film rewinding switch in the rear cover section and to rewind the loaded film even if the film rewinding switch cannot operate because of any trouble in the second microcomputer of the rear cover section, so long as the first microcomputer of the main body section operates normally.

To achieve the above and other objects and advantages, according to the present invention, the first microcomputer checks whether it is possible to communicate with the second microcomputer, and effects a film rewinding operation independently of the film rewinding switch if it is determined that communication with the second microcomputer is impossible.

Because the camera is caused to rewind the film when communication between the microcomputers disposed in the main body and in the rear cover is impossible, the user can open the rear cover at an appropriate time without damaging the film loaded in the camera, for example, for repair or battery change, even if any trouble occurs in the rear cover section of such a camera wherein the film rewinding switch is disposed in the rear cover section and is monitored by the microcomputer disposed in the rear cover section. Therefore, the film rewinding switch can be arranged integrally with the other switches without the danger described above.

BRIEF DESCRIPTION OF THE DRAWINGS

The above and other features of the invention will become apparent from the following description of preferred embodiments thereof with reference to the accompanying drawings in which like parts and elements are designated by the same reference numerals throughout the several views of the drawings and wherein.

DETAILED DESCRIPTION OF PREFERRED EMBODIMENTS

Figure 1:
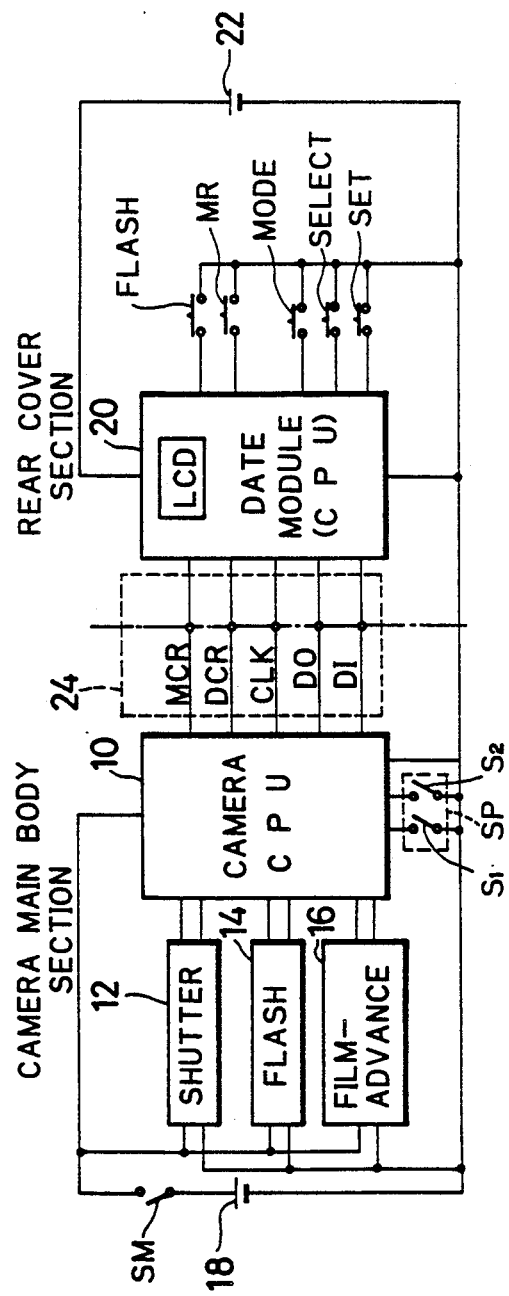
FIG. 1 is a block diagram schematically showing the circuitry of a camera embodying the present invention.
Figure 2:
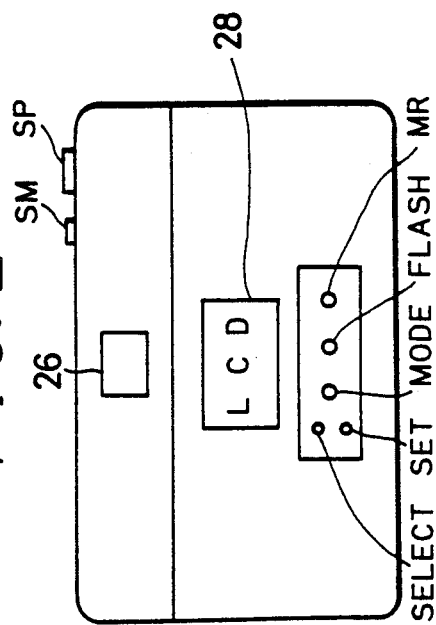
FIG. 2 is a rear elevational view of the camera.

The camera shown in FIGS. 1 and 2 comprises a camera CPU 10 and a date module CPU 20 disposed respectively in its main body section and rear cover section, wherein the two CPUs 10 and 20 each include a microcomputer. The camera CPU 10 controls a shutter 12 on the basis of subject brightness and subject distance as detected by brightness measuring and distance measuring sections (not shown), and also controls a flash unit 14 and a film advance mechanism 16.

In the main body, there are disposed a power switch SM and a shutter release button SP comprising two switches S1 and S2 of which the switch S1 is turned on upon half-depression of the shutter release button SP and the switch S2 is turned on upon full-depression of the shutter release button SP. A flash mode selection switch FLASH, a film rewinding switch MR, a date mode selection switch MODE for selecting which of date or time is to be displayed, a select switch SELECT for selecting which of date or time is to be corrected, and a set switch SET for setting date or time are disposed adjacent each other in the rear cover section.

In FIG. 1, 18 is a battery for the main body section, 22 is a battery for the date module such as a coin-shaped lithium battery which lasts for a long time, and 24 is a communication cable for data transmission between the main body section and the rear cover section. In FIG. 2, 26 and 28 are a viewfinder and a liquid crystal display (LCD), respectively.

The LCD 28 is part of the date module and is disposed on an outer surface of the rear cover section for showing the photographer the date that will be recorded. The LCD 28 also displays other information such as whether a film is loaded, how many frames have been exposed, or which mode is now selected from among an auto-flash mode, a manual-flash mode and a flash inhibition mode, for instance. It is, of course, possible, to provide an LCD in the main body for displaying the above and other information, but a common LCD in the rear cover conveniently displays the information and helps make the camera compact and inexpensive.

Figure 3:
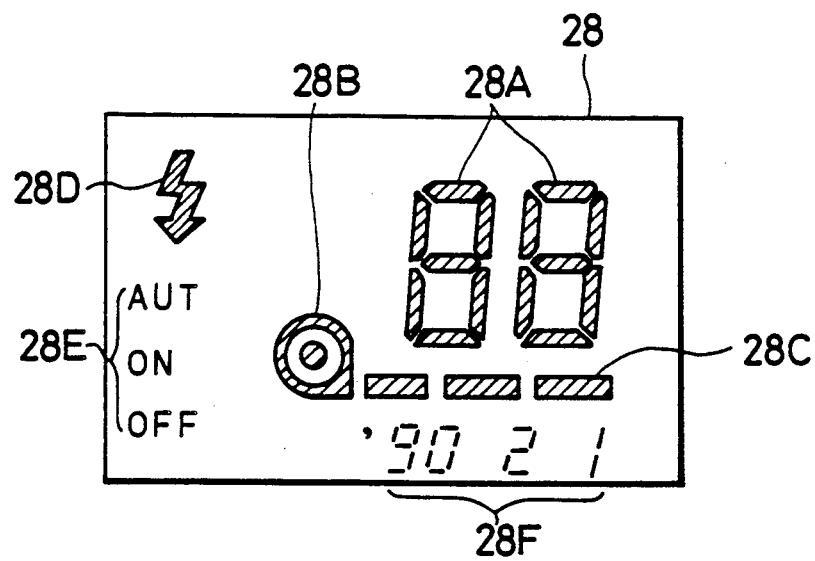
FIG. 3 is an explanatory view showing an LCD of the camera in detail.

FIG. 3 shows an example of the display on the LCD 28. The LCD 28 comprises a frame number display segment 28A, a patrone mark 28B for indicating whether a patrone is contained in the camera, a film advance display segment 28C, a flash charge mark 28D for indicating that the flash unit is being charged, a flash mode display segment 28E, and a date/time display segment 28F. The flash mode is selected by means of the flash mode selection switch FLASH, for example, in such a way that the flash mode is changed over from one to another of the auto-flash mode "AUTO", the manual-flash mode "ON" and the flash inhibition mode "OFF" each time the switch FLASH is depressed, while the LCD 28 displays the selected mode in the segment 28E.

The data communication between the main body section and the rear cover section is normally carried out in a manner as set forth below.

Figure 4:
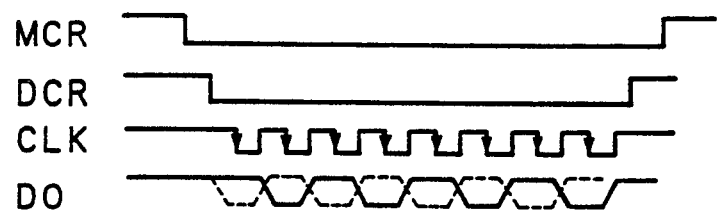
FIG. 4 shows timing charts of signals in data cables when data are transmitted from the camera main body section to the rear cover section.

FIG. 4 shows timing charts of a data communication wherein data are transmitted from the main body section to the rear cover section. At the outset, the camera CPU 10 emits a signal MCR having a low level. Upon receipt of this low level MCR signal, the date module 20 emits a signal DCR of low level for indicating that the date module 20 is ready to receive data. Upon receipt of this low level DCR signal, the camera CPU 10 sends a clock signal CLK and the datum DO in synchronism with the falling edge of the clock signal CLK.

If a datum is an 8-bit serial signal in this data communication system, the date module 20 returns the signal DCR to high level after receiving eight clock pulses from the camera CPU 10. Upon receipt of this high level DCR signal, the camera CPU 10 also returns the signal MCR to high level, thereby terminating the data transmission.

In this way, the camera CPU 10 sends data to the date module 20 so as to display the frame number or other information representative of the camera conditions in the LCD 28.

Figure 5:
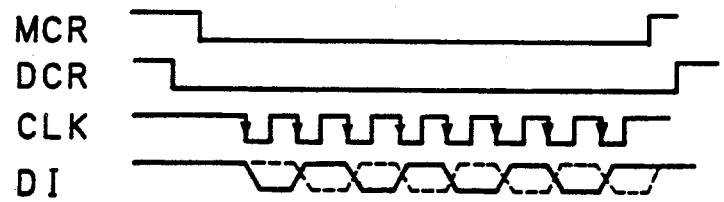
FIG. 5 shows timing charts of signals in data cables when data are transmitted from the rear cover section to the main body section.

On the other hand, when transmitting data from the rear cover section to the main body section, at the outset the date module 20 emits a signal DCR of low level as shown in FIG. 5. Upon receipt of this low level DCR signal, the camera CPU 10 emits the signal MCR of low level for indicating that the camera CPU 10 is ready to receive data. Upon receipt of this low level MCR signal, the date module 20 sends a clock signal CLK and a datum DI in synchronism with the falling edge of the clock signal CLK.

It is to be noted that there are two types of data communication wherein data are transmitted from the rear cover section to the main body section: a first case wherein the data transmission from the rear cover section is independent of the camera CPU 10, and a second case wherein a data transmission from the rear cover section is responsive to a command from the camera CPU 10. The first case arises, for example, when the film rewinding switch MR is turned on. Then the date module 20 emits a signal DCR of low level so as to request the camera CPU 10 to receive data, and then sends the command from the switch MR as the data to the camera CPU 10. Upon receipt of these data, the camera CPU 10 executes film rewinding. On the other hand, when the switch S1 is turned on, the camera CPU 10 requests the date module 20 to send data such as the present frame number, the present flash mode or the like, so that the date module 20 sends the requested data to the camera CPU 10.

The operation of the camera according to the invention will now be described with reference to FIGS. 6A and 6B.

Figure 6A:
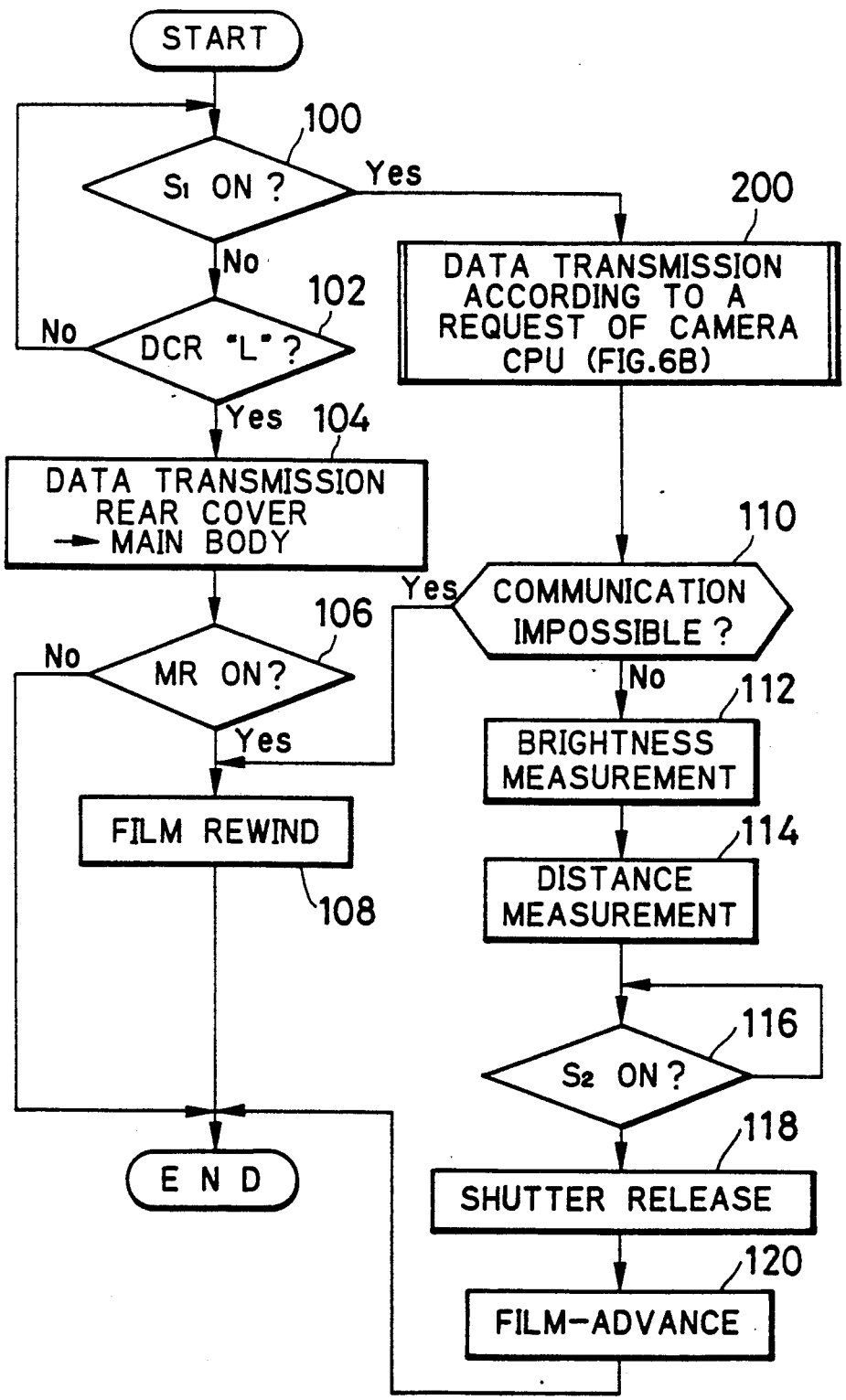
FIGS. 6A and 6B show flow charts that explain the sequence of operation of the camera related to the invention.

As shown in FIG. 6A, when the power switch SM is turned on, the camera CPU 10 starts checking continuously the conditions of the switches and input signals, for example, whether the switch S1 is turned on, and whether the signal DCR is at low level (steps 100 and 102). When the signal DCR becomes low level while the switch S1 is off, then the above-described data communication of the first case is executed (step 106). If the switch MR is turned on in this case, then the film is rewound (step 108).

On the other hand, when the shutter release button SP is half-depressed to turn the switch S1 on in the step 100, then the above-described data communication of the second case is executed (step 200).

Figure 6B:
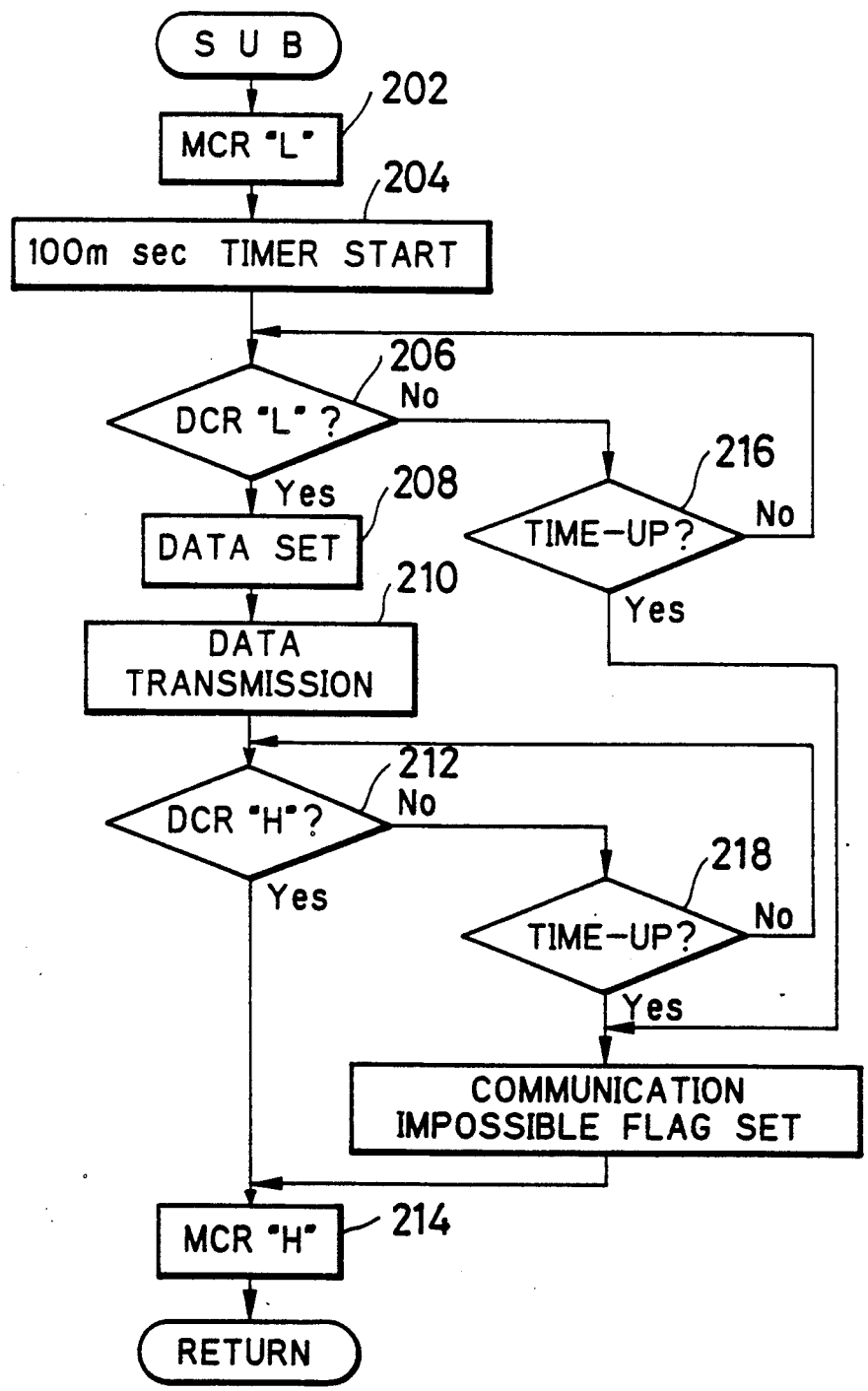

The detail of step 200 is shown in FIG. 6B. At the outset the signal MCR is set at a low level and a timer of 100 msec. is set to start clocking (steps 202 and 204). Then, it is determined whether the signal DCR is to become low level to indicate that the date module 20 is ready to receive data (step 206).

When the signal DCR becomes low level, then the camera CPU sets a data and sends it to the camera CPU 10 (steps 208 and 210). Thereafter, it is determined whether the signal DCR returns to high level to indicate the completion of the data communication (step 212). When the signal DCR returns to high level, then the camera CPU 10 returns the signal MCR to high level, terminating the data communication (step 214).

If the signal DCR does not become low level in step 206, then it is determined in the step 216 whether the time interval of 100 msec. has elapsed. If so, then the camera CPU 10 sets a flag indicating that data communication is impossible. In the same way, if it is determined in the step 218 that the signal DCR does not return to high level in step 212 within the time interval of 100 msec., then the camera CPU 10 also sets a flag indicative of the impossibility of data communication in step 220. In these cases, the camera CPU 10 terminates the data communication after setting the flag.

Subsequent to step 214, it is determined in step 110 of FIG. 6A whether the flag is set. If not, the subject brightness measurement and the subject distance measurement are performed in steps 112 and 114. Thereafter when the shutter release button SM is fully depressed to turn the switch S2 on (step 118), then the film is wound up by one frame (step 120).

On the other hand, if it is determined in step 110 that the flag is set, then the film is forcibly rewound in the step 108.

The invention has been described in detail with particular reference to a preferred embodiment thereof, but it will be understand that variations and modifications can be effected within the spirit and scope of the invention.

What is claimed is:

1. A camera having a main body section and a rear cover section and first and second microcomputers disposed respectively in the main body and rear cover sections, wherein the microcomputers transmit data and commands to each other, said camera comprising:
   a film rewinding switch disposed in the rear cover section, by means of which a loaded film is rewound;
   means for determining whether said microcomputers can communicate with each other; and
   means for rewinding the film independently of said film rewinding switch when it is determined that said microcomputers cannot communicate with each other.

2. A camera as defined in claim 1, wherein said film rewinding switch is monitored by said second microcomputer disposed in the rear cover section.

3. A camera as defined in claim 2, wherein said film rewinding switch is disposed integrally with other operational switches on an external surface of the rear cover section.

4. A camera as defined in claim 3, further comprising a date module for recording a date onto the film, said date module including said second microcomputer.

5. A camera as defined in claim 4, wherein said date module further includes a liquid crystal display for displaying the date to be recorded, said liquid crystal display being disposed on an external surface of the rear cover section.

6. A camera having first and second microcomputers which transmit data and commands to each other, the first microcomputer being disposed in a main body section of the camera and controlling the camera mechanisms, and the second microcomputer being disposed in a rear cover section of the camera and controlling a display, said camera comprising:
   a film rewinding switch disposed in the rear cover section and outputting a first signal, said first signal being transmitted to the second microcomputer through the first microcomputer; and
   film rewinding means for performing film-rewinding in response to a film rewinding signal from the first microcomputer; wherein the first microcomputer sends said film rewinding signal to said film rewinding means upon receipt of said first signal, and also upon detecting that a data communication with the second microcomputer is impossible.

7. A method of film-rewinding for a camera having first and second microcomputers disposed respectively in a main body section and a rear cover section of the camera and having a film rewinding switch for rewinding a loaded film, said film rewinding switch being monitored by the second microcomputer disposed in the rear cover section, said method comprising the steps of:
   determining whether the second microcomputer monitoring said film rewinding switch is able to communicate with the first microcomputer; and
   rewinding the film independently of said film rewinding switch when the first microcomputer is not able to communicate with the second microcomputer.

* * * * *